United States Patent Office 3,144,055
Patented Aug. 11, 1964

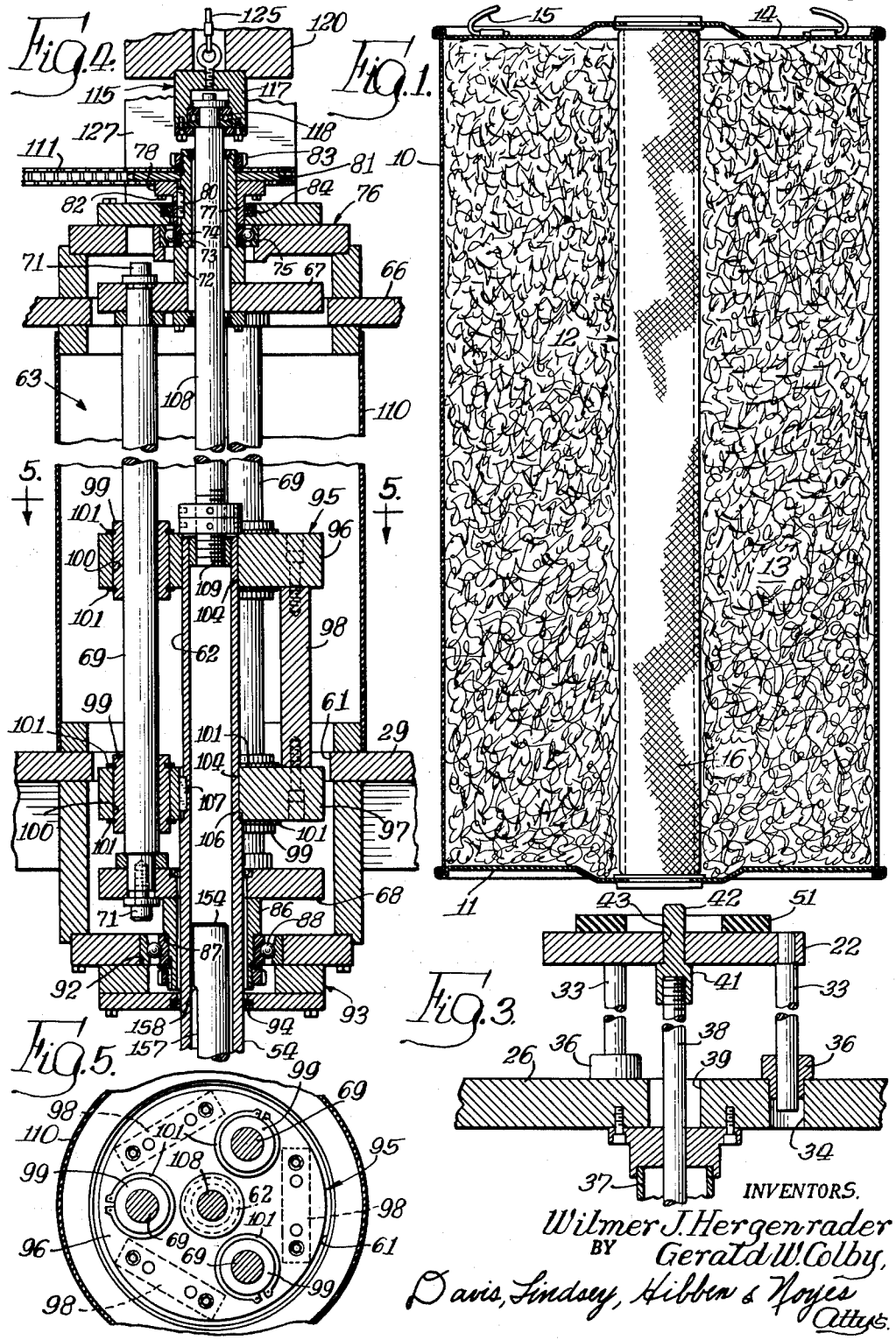

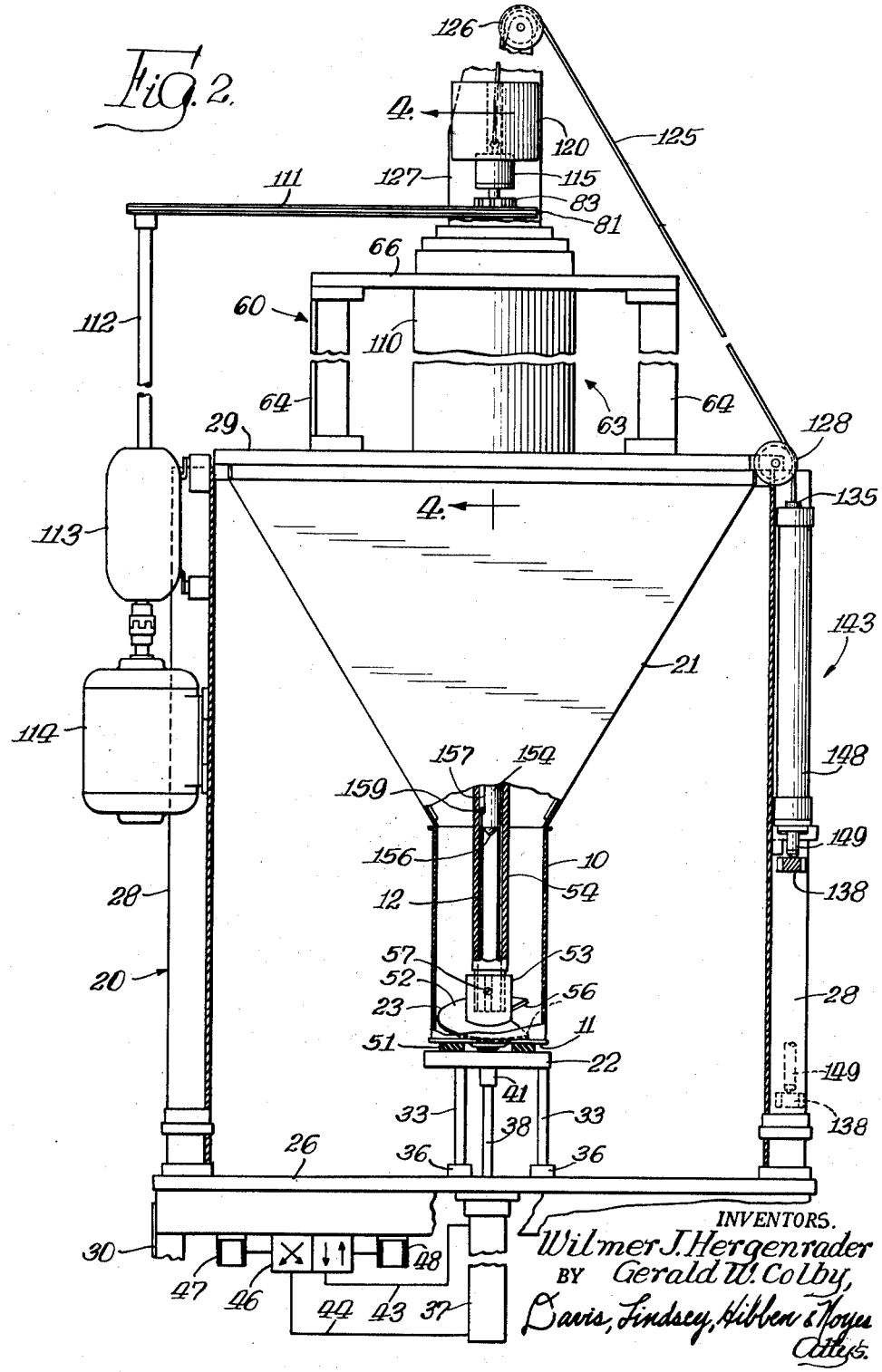

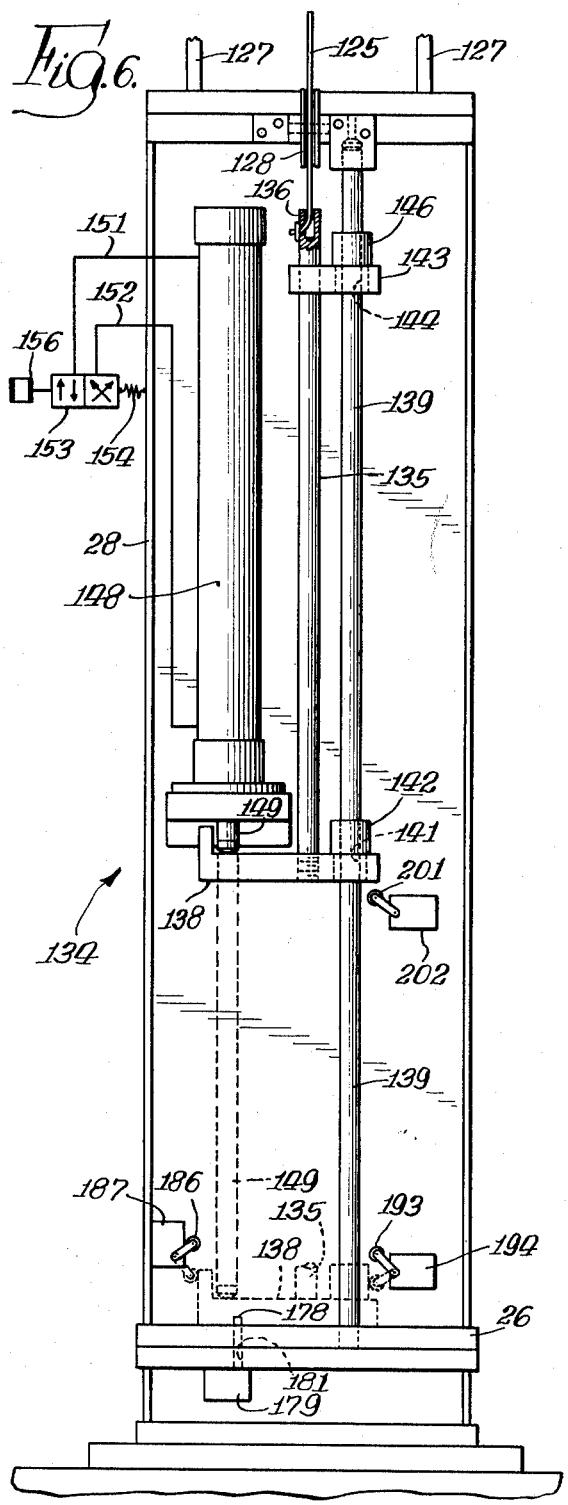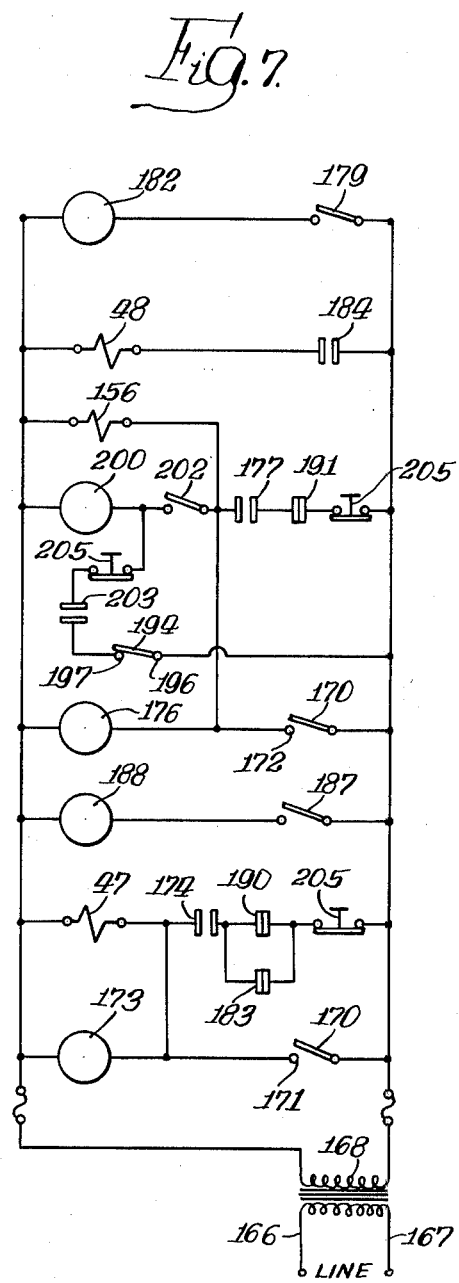

3,144,055
APPARATUS FOR MAKING A FILTER ELEMENT
Wilmer J. Hergenrader and Gerald W. Colby, Seymour, Ind., assignors to Cummins Engine Company, Inc., Columbus, Ind., a corporation of Indiana
Filed Jan. 30, 1961, Ser. No. 85,733
10 Claims. (Cl. 141—73)

The present invention relates to filter elements, and particularly to elements of filters utilized for filtering the lubricating oil of internal combustion engines. It also relates to apparatus for and a method of making such elements.

The general object of the invention is to provide a novel filtering element through which the oil will flow uniformly throughout the entire element.

Another object is to provide a novel filtering element containing filtering material, which may be easily and inexpensively manufactured.

A further object is to provide a novel method of making such an element.

Still another object is to provide a novel method of making such an element, including a novel method of packing filtering material in the element.

A still further object is to provide a novel apparatus for packing filtering material in a container to provide a filtering element of the foregoing character.

Other objects and advantages of the invention will be apparent to those skilled in the art upon making reference to the detailed description which follows and to the accompanying drawings, in which:

FIGURE 1 is a longitudinal sectional view, with some parts in elevation, of a filter element embodying the features of the present invention;

FIG. 2 is a fragmentary elevational view of a machine embodying other features of the invention and adapted for filling and packing a filter element such as the filter element shown in FIGURE 1;

FIG. 3 is a fragmentary vertical sectional view of a portion of the apparatus of FIG. 2;

FIG. 4 is an enlarged fragmentary longitudinal sectional view taken on the line 4—4 of FIG. 2;

FIG. 5 is a sectional view taken along the line 5—5 of FIG. 4;

FIG. 6 is a side elevational view of the right side of the apparatus as shown in FIG. 2; and FIG. 7 is a wiring diagram of the circuitry employed in the apparatus of FIG. 2.

The lubricating oil of an internal combustion engine, during operation, becomes contaminated with dirt and other foreign matter which is harmful to the engine if permitted to remain in the oil during operation of the engine. For this reason, a filter is provided to filter the oil during operation of the engine and thus remove such foreign matter. Usually, such a filter comprises a casing having an inlet and an outlet connected to the lubricating system of the engine to pass oil therethrough. Within the casing is mounted a filtering element through which the oil is passed and containing material which removes the foreign matter. Such elements are usually made in a form which is readily removable from the casing so that an element, when it becomes dirtied, may be removed and a clean element substituted. It is thus desirable to provide a simple and inexpensive element for this purpose, which is highly effective in removing the foreign matter.

A filtering element of this character usually comprises a container in which filtering material is packed. Such an element is shown in FIGURE 1 of the drawings and is illustrated as comprising a cylindrical container 10 having a bottom wall 11 and a central tube 12 extending upwardly therefrom. The annular space between the cylindrical wall of the container 10 and central tube 12 is filled with filtering material 13, the latter being packed therein. Closing the top of the container is a top wall 14, and a handle 15 may be secured to the container to facilitate insertion in and removal of the filter from the casing. The cylindrical wall of the container 10 is perforated to permit oil to flow therethrough into the filtering material 13, and the central tube 12 is also perforated to permit the filtered oil to pass to the interior of the tube and thence to the filter outlet. Preferably, the central tube 12 is wrapped with cloth indicated at 16, to prevent the filtering material from passing through the perforations in the tube.

Numerous different types of materials have been proposed for use as the filtering material 13. In the present instance, the filtering material 13 comprises a mixture of paper and sawdust. The paper is prepared by converting it into small flakes, say, flakes of approximately one-half inch in diameter. The paper preferably has a content of approximately 60% rag and 40% wood fibre. To this is mixed sawdust which is preferably made from kiln-dried, graded, northern hardwood.

This mixture, if merely fed into the element container without packing, would be insufficiently dense to properly filter the oil. It is, therefore, necessary to pack the material into the container. In packing the material in the container, if the material is not packed to a substantially uniform density throughout the container, the major portion of the oil will pass through those portions of the material that are less densely packed and will be inadequately filtered. Heretofore, attempts have been made to obtain a uniform density of packing of the material but such attempts have not been entirely successful.

In the filter element disclosed herein, a substantially uniform density of packing of the material has been attained. Broadly, such uniform density is attained by progressively and continuously feeding and packing the material in the container. Such packing preferably is attained by inserting a feed screw or auger into the container adjacent the bottom thereof and supplying the container with loose filtering material. The feed screw then feeds the material toward the bottom of the container and packs it continuously during the operation of the screw. As the material is thus fed and packed, the reaction of the packed material against the screw causes the screw to move longitudinally of the container to completely fill the container with the material packed to a substantially uniform density throughout the length of the container.

A machine for packing the filtering material into the container to provide a filtering element of the foregoing character is illustrated in FIGS. 2 to 7, inclusive, of the drawings. Such machine comprises generally frame structure 20 which carries means for supplying material to the container 10 in the form of a funnel 21. The frame structure also carries supporting means for the container in the form of a table 22 on which the container 10 is adapted to be placed. The table 22 is movable to move the container 10 from a loading position to a position adjacent the lower end of the funnel 21 for filling. The machine also includes packing means comprising a feed screw or auger 23 adapted to be moved downwardly in the container to a position adjacent the bottom thereof. The filtering material is then supplied to the funnel 21 and hence to the container 10, and the feed screw 23, by rotation, feeds the material toward the bottom of the container and packs it thereagainst. Such feeding and packing continues until the continer is filled, the reaction of the packed material below the screw 23 forcing the screw upwardly. The density of the packing is determined by exerting a downward force on the screw, preferably by weighting it. When the feeding and packing has been completed, the screw is moved to an out-of-the-way position, the table 22 is lowered, and the filled container is removed.

The frame structure 20, illustrated in FIGS. 2 and 6, in this instance, comprises a bed 26 and a pair of upright members 28 secured at their lower ends to the bed 26 and at their upper ends by a cross member 29. Legs 30 extend downwardly from the bed 26. The funnel 21 is shown as being conical in form and has its upper or larger end secured to and supported by the cross member 29.

The table 22 is mounted on the bed 26 for movement between an elevated operative position and a lowered inoperative position adjacent the top of the bed 26. To this end, the table 22 includes means for moving the latter between its operative and inoperative positions. Thus, the table includes a plurality of elongated legs 33 (see FIG. 3) secured at their upper ends to the table 22 and extending downwardly through openings 34 in the bed 26. To guide the movement of the table 22, the openings 34 may be provided with guide bushings 36 mounted in the openings 34, thus providing tubular bearing surfaces for the legs 33 during movement thereof.

In order to effect movement of the table 22 between its operative and inoperative positions, moving means is provided. Such moving means in this instance comprises an air cylinder and piston assembly 37 having a piston rod 38. The cylinder 37 is secured to the underside of the bed 26 with the rod 38 thereof extending upwardly through an opening 39 in the bed 26. A fitting 41 is secured to the upper end of the rod 38, the fitting 41 having an elongated stud portion 42 extending upwardly through an opening 43 in the table 22 and projecting above the upper surface thereof. The stud portion 42 is adapted to enter the central tube 12 to center the container 10 on the table.

In order to effect movement of the piston rod 38, the air cylinder 37 is adapted to selectively receive air under pressure from a pair of lines 43 and 44 communicating with each side of the piston. Thus, as shown in FIG. 2, the line 43 is connected to the upper end of the cylinder 37 and is effective when connected to a source of air under pressure to lower the piston rod 38 and thus move the table 22 downwardly to an inoperative position adjacent the bed 26. The line 44 is connected to the lower end of the cylinder 37 and is effective to raise the plunger 38 when connected to a source of air under pressure to raise the table 22 to its operative position illustrated in FIG. 2.

For supplying air under pressure to the lines 43 and 44, valve means is provided. Such valve means in this instance comprises a 4-way valve 46, indicated diagrammatically in FIG. 2, and means for actuating the valve 46. The valve 46 is adapted to be connected with a source of air under pressure (not shown) and is effective when in one position to connect one of the lines 43 and 44 to the source of air under pressure and to connect the other line to the atmosphere. When the valve 46 is in another position, a reversal of the connections is obtained. The actuating means for shifting the valve 46 between its respective positions in this instance comprises a pair of solenoids 47 and 48 connected to the valve 46 and each effective when energized to shift the valve 46 between its respective positions.

The table 22 is adapted to support a filter container 10 thereon and to raise it to a position engaging the lower end of the funnel 21 to permit filling thereof with the filtering material 13. To this end, the table 22 is provided with means for preventing rotation of the container 10 as the feed screw 23 is rotated. Such means in this instance comprises an annular pad 51 (FIGS. 2 and 3) secured to the upper surface of the table 22 and surrounding the projecting stud pjortion 42 of the fitting 41. The pad 51 is of a resilient material, preferably rubber, and is adapted to frictionally engage the underside of the bottom wall 11 of the container 10. The container 10 is thus located by the projecting stud portion 42 and is prevented from rotating during a filling operation due to the frictional engagement of the bottom wall 11 with the pad 51.

The packing means or screw 23 in this instance comprises a radially extending helical blade 52 (FIG. 2) having a hub 53 secured to the lower end of a vertically mounted shaft 54 for rotatably driving the blade 52. In the present instance, the blade 52 preferably has a circumferential extent of substantially three-quarters of one revolution, such that a gap is formed between the ends, indicated at 56, of the blade 52 to permit material to pass therethrough. The hub 53 may be secured to the end of the shaft 54 by a key (not shown) and a set screw 57.

As previously mentioned, the funnel 21, which supplies filter material to the container 10, serves to direct a predetermined quantity of the material into the container 10 prior to a packing thereof by the screw 23. Such packing is achieved by rotation of the screw 23 in a direction to pack the material against one end of the container, in this instance the bottom wall 11. The screw moves itself upwardly through the loose material by the reaction against the material already packed below it when a predetermined density of the packed material is achieved. Such packing thus occurs progressively and continuously until the entire container is filled.

In order to effect the filling and packing operation, the screw 23 is lowered vertically into the container from a position above the container to a position adjacent the bottom wall thereof.

Thus, the shaft 54 to which the screw 23 is secured extends upwardly through the funnel 21 and an opening 61 (FIG. 4) in the cross member 29. The upper end of the shaft 54, indicated at 62, is mounted in a rotary drive and guide means, indicated generally at 63, which is supported by a drive support 60 (FIG. 2). The drive support 60 includes upright members 64 mounted on the cross member 29 and a horizontal support member 66 mounted at the upper ends of the members 64.

The drive means 63 thus comprises a pair of annular axially spaced plates 67 and 68, the plates 67 and 68 being secured in this instance to the ends of three circumferentially spaced axially extending rods 69, as at 71. Extending upwardly from the upper plate 67 and secured thereto is a sleeve 72. The sleeve 72 is provided with a shoulder 73 on which the inner race of a bearing 74 is mounted. The outer race of the bearing 74 is carried on a shoulder 75 formed in an upper bearing support structure 76 which is mounted on the support member 66. The sleeve 72 extends upwardly through the bearing support structure 76 and is enclosed by a member 77 having a flanged upper end 78. The member 77, at its lower end, engages the inner race of the bearing 74 and intermediate its length is secured to the sleeve 72 by a key 80. At its upper end, member 77 is secured to a sprocket 81 by a plurality of bolts 82. A lock nut 83 at the upper end of the sleeve 72 retains the parts in assembled relation. A seal 84 is located above the bearing 74.

The lower end of the drive means 63 is similarly mounted in the cross member 29. Thus, the lower plate 68 includes a sleeve 86 secured to the lower side thereof and extending downwardly. The sleeve 86 is provided with a shoulder 87 against which the inner race of a bearing 88 is seated. The inner race of the bearing 88 is held against the shoulder 87 by a nut 91 threaded onto the lower end of the sleeve 86. The outer race of the bearing 88 is seated on a shoulder 92 formed in a lower bearing support structure 93 secured to the lower side of the member 29. A seal 94 is located below the bearing 88.

In order to provide a driving connection between the upper end 62 of the shaft 54 to effect rotation thereof with the drive means 63 and to permit vertical guided movement of the shaft 54 between its upper and lower limit positions, a slider assembly indicated generally at 95 is provided. The slider assembly 95 in this instance comprises a pair of axially spaced annular plates or discs 96 and 97 mounted on the rods 69 for vertical sliding movement between the plates 67 and 68. The plates 96 and 97 are secured to each other by blocks 98. To this end, each of the plates 96 and 97, in this instance, is provided with three circumferentially spaced bushings 99 (FIGS. 4 and 5) which are mounted in spaced openings 100 in the plates 96 and 97 and retained therein by snap rings 101 on each side of each of the plates. The bushings 99 permit free sliding movement of the slider assembly 95 on the rods 69.

The upper end 62 of the shaft 54 extends centrally through openings 104 in the plates 96 and 97, the lower plate 97 being seated on annular shoulder 106 formed on the upper end 62 of the shaft 54. A key 107 serves to interconnect the shaft 54 with the slider 95 and hence with the drive means 63.

In order to provide for vertical movement of the slider assembly 95 and shaft 54, the latter includes an extension 108 secured to the upper end of the shaft, the extension being connected to means for controlling vertical movement to the shaft 54 and hence the screw 23. Thus, the extension 108 has its lower end 109 secured to the upper end of the shaft 54 by a threaded connection. The upper end 62 of the shaft 54, the extension 108, and the slider assembly 94 are all enclosed within a cylindrical casing 110, extending between the cross member 29 and the horizontal support member 66.

Rotation of the sprocket 81 and thus the screw 23 is effected by a chain 111 engaged with the sprocket 81 and driven by a sprocket mounted at the upper end of a vertically extending shaft 112 (FIG. 2). The shaft 112 is connected to a transmission 113 driven by a motor 114. The transmission 113 provides the desired speed reduction to drive the screw 23.

The extension 108 extends upwardly through the upper bearing support structure 76 and sprocket 81, and has a swivel 115 secured to its upper end. The swivel 115 comprises an inverted cup member 117 secured to the extension 108 for longitudinal movement therewith and permitting relative rotation by means of a thrust bearing 118.

As heretofore mentioned, the screw 23 is moved upwardly by the reaction of the packed material against the screw. The density of the packed material is therefore determined by the downward force exerted by the screw. Preferably, the screw is preloaded in a downward direction to attain the desired density in the packed material. To this end, a downward force is exerted on the screw by placing a weight 120 on the upper end of the shaft extension 108. In the present instance, the weight 120 is seated on the swivel 115. Of course, the size of the weight may be varied to vary the density to which the material is packed.

The vertical movement of the screw 23 is controlled by means which permits the screw to be lowered into the container 10 at the start of the filling operation and to be raised as the material is packed into the container 10. Such means also is operable to move the screw to an out-of-the-way position when the filling operation has been completed. To this end, an eyebolt 124 is secured to the upper end of the swivel 115 to which one end of a cable 125 is connected. The swivel 115 thus prevents the cable 116 from becoming twisted due to rotation of the extension 108 and shaft 54. As will be apparent from FIG. 2, the cable 125 extends upwardly and passes over a pulley 126 carried by a bracket 127 extending upwardly from the upper support structure 60. The cable 125 then extends diagonally downward to another pulley 128 (FIGS. 2 and 6) mounted at the side of the cross member 29. The cable 125 extends downwardly from the pulley 128 and is secured to the means, indicated generally at 134, for controlling the vertical movement of the screw 23.

The means 134 in this instance comprises an elongated vertically extending rod 135 (FIG. 6) secured at its upper end 136 to the end of the cable 125 and having its lower end 137 threaded into a horizontally extending plate 138. Thus, when the plate 138 moves upwardly, the screw 23 moves downwardly, and when the plate moves downwardly, the screw moves upwardly. To guide movement of the rod 134, an elongated vertically extending rod 139, spaced transversely from the rod 135, is secured at its lower and upper ends to the bed 26 and cross member 29, respectively. The plate 138 is provided with a vertical bore 141 therethrough, having a bushing 142 through which the rod 139 extends. Similarly, a horizontally extending guide block 143 having a vertical bore 144 therethrough is secured to the upper end 136 of the rod 135, the bore 144 being provided with a bushing 146 through which the rod 139 extends. Thus, the plates 138 and 143 guide the rod 135 during vertical movement thereof between the full and dotted line positions of the plate 138 illustrated in FIG. 6.

As heretofore mentioned, the control means 134 also includes means for moving the rod 135 and hence the screw 23 during part of its movement and to control the movement during other parts. Such means in this instance comprises another air cylinder and piston assembly 148 mounted on the side of the frame structure 20 adjacent the rod 135. The assembly 148 includes a piston rod 149 adapted to engage the plate 138 to move the latter downwardly. A pair of air lines 151 and 152 are provided for communicating air under pressure to each side of the piston, the line 151 being connected to the upper end of the cylinder of the assembly 148 and the line 152 being connected to the lower end of the cylinder. Thus, the line 151, when connected to a source of air under pressure, will cause the rod 149 to move out of the cylinder and move the plate 138 downwardly to its dotted line position. Similarly, air under pressure in the line 152 will cause the rod 149 to retract upwardly into the cylinder to permit the plate 138 and hence the rod 135 to move upwardly to its full line position. In order to control the communication of air under pressure to the lines 151 and 152, a 4-way valve 153 is provided, similar to the valve 46. The valve 153, indicated diagrammatically in FIG. 6, is thus movable between one position to connect the line 151 to a source of air under pressure and the line 152 to atmosphere, and to another position to reverse these connections. The valve 153 differs in its manner of actuation from the valve 46 in that a spring 154 is operatively connected thereto to normally urge the valve into one of its positions and a solenoid 156 is provided, which when energized, overcomes the force of the spring 154 and shifts the valve to its other position. In the present instance, the spring 154 holds the valve in a position to connect the line 151 to the source of air under pressure and the line 152 to atmosphere. The piston rod 149 is thus extended to its dotted line position illustrated in FIG. 6. When energized, the solenoid 156 moves the valve to its other position to reverse the above connections and retract the piston rod 149 to its full line position.

In order to effect a packing operation, the screw 23 is moved vertically downward into the container 10 adjacent the bottom wall 11 thereof, so that filtering material is packed against the bottom wall. To this end, the hub 53 and shaft 54 are tubular, and have an internal diameter such as will permit these parts to telescope over the central tube 12 of an empty container to the position shown in FIG. 2. In order to center the tube 12 in the container, the shaft 54 includes a pilot which engages the upper end of the central tube 12 and centers the hub 53 and shaft 54 during downward movement thereof into the container 10. As will be apparent from FIGS. 2 and 4, the pilot, in this instance, comprises a rod 154 mounted within the shaft 54 and movable relative thereto. The lower end of the rod is conical as at 156 to facilitate centering of the tube 12. In order to prevent the rod 154 from falling out of the hollow shaft 54 when the latter has been raised to its upper position, the rod 154 is formed with a flat 157 (FIG. 4) defining a shoulder 158 adjacent its upper end. A pin 159 extends transversely of the shaft 54 and across the flat 157 so as to engage the shoulder 158 when the rod 154 has been moved by gravity toward the lower end of the shaft 54.

While the solenoids 47 and 48 which control the valve 46 to raise and lower the table 22, and the solenoid 156 for shifting the valve 153 to raise and lower the screw 23, as well as starting and stopping the motor 114, could be performed under the manual control of an operator, it is preferred to control these operations automatically under the control of a single manual control means or switch. Thus, after an operator has placed an empty container 10 on the table 22 for filling, manual closing of the single switch initiates a sequence of operations which automatically fills and packs the container, the cycle terminating automatically with the parts in position for another filling and packing operation. The only manual operations necessary to be performed with the present apparatus are those of initially placing an empty container 10 on the table 22, and adding a predetermined amount of filler material 13 into the funnel 21 for a filling and packing operation, and then actuating the single switch into the container 10.

In FIG. 7, a schematic diagram of an electrical control system for effecting the foregoing automatic operation of the filling and packing apparatus of the present invention is illustrated. Thus, in FIG. 7, it will be seen that current is supplied to the various parts of the circuit from a pair of lines 166 and 167 connected to a suitable source of current. If the voltage across the lines 166 and 167 exceeds standard line voltage, that is 110 volts, a stepdown transformer 168 may be provided to reduce the voltage to 110 volts. After an empty container 10 has been placed on the table 22 for a filling and packing operation, the table 22 being in a lowered position adjacent the bed 26, a filling and packing cycle is initiated by the operator's closing of a manually operated switch 170, preferably a foot-operated switch, illustrated diagrammatically at two locations in FIG. 7. In the present instance, the switch 170 has two sets of contacts 171 and 172 which are closed simultaneously. Closing of the contacts 171 serves to complete a circuit to energize the solenoid 47 and shift the valve 46 to a position to connect the line 44 to the source of air under pressure and to connect the line 43 to atmosphere. The table 22 is thus raised and the empty container thereon is brought into contact with the lower end of the funnel 21. At the same time, current is supplied to the coil, indicated at 173, of a holding relay in circuit with contacts 171. Energization of the coil 173 closes a pair of contacts 174 in circuit with the solenoid 47 and the coil 173. Thus, when the footswitch 170 is released, current continues to be supplied to the solenoid 47 and the coil 173.

Actuation of the foot switch 170 also closes the contacts 172 to complete another circuit controlling the solenoid 156 which shifts the valve 153 to connect the line 152 to the source of air under pressure and the line 151 to atmosphere. The rod 149 is thus retracted, and the screw 23 is permitted to move downwardly from an elevated position into the container 10. At the same time, current is supplied to the coil, indicated at 176, of a second relay in circuit with the solenoid 156. Energization of the coil 176 closes a pair of contacts 177 to maintain a circuit through the solenoid 156 and the coil 176 when the footswitch 170 is released.

After the solenoid 156 is energized, the screw 23 will descend into the container 10. As the screw starts to move down, the plate 138 begins to move upwardly from its dotted line position illustrated in FIG. 6. Such movement permits the depressible plunger 178 of a switch 179 to move upwardly to open the switch 179. The switch 179 is in circuit with a relay having a coil 182 and two pairs of contacts 183 and 184. The contacts 183 are in circuit with the solenoid 47 and are open when the coil 182 is energized and are closed when the coil is de-energized. The contacts 184 are in circuit with the solenoid 48 and are closed when the coil 182 is energized and open when the coil is de-energized. Thus, when the switch 179 is opened by upward movement of the plate 138, the contacts 183 are closed and the contacts 184 are opened.

As the plate 148 continues to move upwardly, the latter engages an arm 186 of another switch 187 to open the switch. The switch 187 de-energizes a coil 188 of still another relay having two pairs of contacts 190 and 191. The contacts 190 are in parallel with the contacts 183 and are connected to the solenoid 47, and contacts 191 are in a circuit with the solenoid 156. On de-energization of the coil 188, the contacts 190 close to complete a second circuit to the solenoid 47, and the contacts 191 close to complete another circuit to the solenoid 156. The footswitch 170 may then be released and current flow is maintained to the solenoids 47 and 156 through the auxiliary circuits. The coil 188 does not immediately close the contacts 190 and 191, but does so after a predetermined time interval. The coil 188 thus constitutes time delay means.

As the plate 138 continues upward movement, it contacts another arm 193 of another switch 194 to actuate the latter. The switch 194 includes a pair of contacts 197 in a circuit to a starter 200 for the motor 114. When closed, the switch 194 prepares this circuit for supplying current to the motor 114. The switch 194 remains closed after passage of the plate 138 in an upward direction and is opened on passage of the plate 138 downwardly.

As the screw 23 approaches the bottom of the container 10, the plate 138 nears its upper limit of travel and engages an arm 201 on another switch 202 mounted on the frame 20, as illustrated in FIG. 6. When the switch 202 closes, the motor starter 200 is closed and the motor 114 is energized. At the same time, a pair of normally open contacts 203, which are in the motor starter 200 and in a branch circuit with the switch 194, are closed. The contacts 203 thus maintain the circuit to the motor 114 after the switch 202 subsequently is opened by upward movement of the screw 23 and downward movement of the plate 138.

Filtering material 13 is then added to the funnel 21 and is caused to be moved toward the bottom wall 11 of the container by the action of the helical blade 52 of the screw. The screw 23 will continue to feed filtering material toward the bottom of the container until the latter has become packed to a predetermined density sufficient to overcome the weight of the screw, shaft 54, and the weight 120 resting on the swivel 115. At this time, the screw will move itself upwardly through the filtering material, progressively and continuously packing additional material beneath it to a uniform density.

During the first part of the upward movement of the screw 23 and downward movement of the plate 138, the switch 202 is opened. The motor circuit, however, is maintained through the contacts 203 and switch 194. As the screw moves to the top of the container and completes the filling and packing operation, the plate 138 engages the arm 186 of switch 187 to close the latter and thus close the circuit to the relay coil 188. This relay, being of the time-delay type, will after a predetermined period of time open contacts 190 and 191. Opening of the contacts 190 places the solenoid 47 solely under control of the contacts 183. Opening of the contacts 191 de-energizes the solenoid 156 and the valve 153 will shift, under the influence of the spring 154, to connect the top of the cylinder 148 to air pressure and connect the lower end to atmosphere. This forces the piston rod 149 and the plate 138 down to move the screw 23 to an out-of-the-way position spaced above the packed container. Such movement of the plate 138 also opens switch 194 to stop the motor 114 and thus stop rotation of the screw 23. This final movement of the plate 138 also closes the switch 179 to energize the relay coil 182 which opens contacts 183 and thus de-energizes the solenoid 47 and the relay coil 173 to open contacts 174. It also closes contacts 184 to energize the solenoid 48. Air presusre through the valve 46 is thereby supplied to the upper end of cylinder 37 to lower the table 22. The filled and packed container is thus moved downwardly from the funnel 21 and may be removed from the table 22. The machine is then ready for a repetition of the cycle.

A filter element filled as heretofore described, has its filtering material packed to a substantially uniform density throughout the container 10. Such uniformity is attained by the continuous and progressive feeding and packing of the filtering material effected by the screw 23 from the point where the screw starts packing the material against the bottom of the container until the container is completely filled and packed. Since it is the reaction of the packed material against the screw which causes the latter to rise in the container, and since such reaction is continuous throughout the packing operation, the uniformity of density is thus obtained. The density, of course, may be determined by the size of the weight 120.

We claim:

1. A machine for filling a container of a filter with discrete filtering material and for packing such material therein, said container having a central tube therein, comprising means for supporting said container, means for supplying said material to said container while so supported, and packing means for packing said material in said container progressively and continuously from adjacent one end of the container, said packing means comprising a feed screw having a tubular hub and a radially extending helical blade, said packing means also including a tubular shaft extending into said hub with the latter secured thereto, said shaft and said hub being adapted to telescope over said central tube to permit said screw to move into said container to feed and pack the material against said one end until the container is filled and packed to a substantially uniform density.

2. A machine according to claim 1, in which a pilot is mounted within said shaft and is adapted to engage said central tube to center said central tube in said container.

3. A machine according to claim 2, in which said screw is movable to a position spaced away from the container when the latter is filled, and said shaft and said pilot having portions engageable when the screw is moved out of the container for moving the pilot out of engagement with said central tube.

4. A machine for filling a container of a filter with discrete filtering material and packing such material therein, comprising a vertically movable table for supporting said container, a funnel mounted over said table for supplying said material to said container, means for moving said table vertically for shifting the container into and out of operative relation with said funnel, a feed screw, means for supporting said screw for vertical movement relative to said funnel and into and out of said container, and means for rotatably driving said screw when in said container for feeding said material toward the bottom of said container and for packing the material therein, said screw supporting means comprising a shaft, rotary drive means engaging said shaft adjacent the upper end thereof with said shaft being vertically movable in said drive means, a weight mounted on said shaft at the upper end thereof, a cable secured at one end to said shaft, and a piston and cylinder device secured to the other end of said cable for moving said screw to a position spaced above said container, said device being arranged to permit said screw to be moved upwardly in the container by the reaction of the screw with the material packed.

5. A machine for filling a container of a filter with discrete filtering material and packing such material therein, comprising a vertically movable table for supporting said container, a funnel mounted over said table for supplying said material to said container, means for moving said table vertically for shifting the container into and out of operative relation with said funnel, a feed screw, means for supporting said screw for vertical movement relative to said funnel and into and out of said container, and means for rotatably driving said screw when in said container for feeding said material toward the bottom of said container and for packing the material therein, said screw being movable into said container after said table is shifted into operative relation with said funnel, and said screw driving means being energized in response to movement of the screw into said container.

6. A machine for filling a container of a filter with discrete filtering material and packing such material therein, comprising a vertically movable table for supporting said container, a funnel mounted over said table for supplying said material to said container, means for moving said table vertically for shifting the container into and out of operative relation with said funnel, a feed screw, means for supporting said screw for vertical movement relative to said funnel and into and out of said container, means for rotatably driving said screw when the latter is disposed in said container for feeding said material toward the bottom of said container and for packing the material therein, and means for moving said screw to a position spaced above said container when the latter is filled and packed with material, said last-mentioned means being responsive to the completion of the filling and packing of the material in said container.

7. A machine according to claim 6, including time delay means for delaying the energization of said screw moving means upon completion of the filling and packing of the material in the container.

8. A machine for filling a container of a filter with discrete filtering material and packing such material therein, comprising a vertically movable table for supporting said container, a funnel mounted over said table for supplying said material to said container, means for moving said table vertically for shifting the container into and out of operative relation with said funnel, a feed screw, means for supporting said screw for vertical movement relative to said funnel and into and out of said container, means for rotatably driving said screw when the latter is disposed in said container for feeding said material toward the bottom of said container and for packing the material therein, and means for moving said screw to a position spaced above said container when the latter is filled and packed with material, said screw driving means being de-energized in response to movement of said screw to said position spaced above said container.

9. A machine for filling a container of a filter with discrete filtering material and packing such material therein, comprising a vertically movable table for supporting said container, a funnel mounted over said table for supplying said material to said container, means for moving said table vertically for shifting the container into and out of operative relation with said funnel, a feed screw, means for supporting said screw for vertical movement relative to said funnel and into and out of said container, means for rotatably driving said screw when the latter is disposed in said container for feeding said material toward the bottom of said container and for packing the material therein, and means for moving said screw to a position spaced above said container when the latter is filled and packed with material, said table moving means being movable to shift the container out of operable relation with said funnel in response to movement of said screw to said position spaced above said container.

10. A machine for filling a container of a filter with discrete filtering material and packing such material therein, comprising a vertically movable table for supporting said container, a funnel mounted over said table for supplying said material to said container, means for moving said table vertically for shifting the container into and out of operative relation with said funnel, a feed screw, means for supporting said screw for vertical movement relative to said funnel and into and out of said container, means for rotatably driving said screw when the latter is disposed in said container for feeding said material toward the bottom of said container and for packing the material therein, means for moving said screw to a position spaced above said container when the latter is filled and packed with material, manual control means for energizing said table moving means to shift the container into said operative relation with said funnel and de-energizing said screw moving means to permit said screw to move into said container, and time delay means for delaying the de-energization of said screw moving means until after said table moving means has shifted said container into said operative relation.

References Cited in the file of this patent

UNITED STATES PATENTS

| | | |
|---|---|---|
| 96,455 | Mattison | Nov. 2, 1869 |
| 162,118 | Taggart | Apr. 13, 1875 |
| 2,114,103 | Driscoll et al. | Apr. 12, 1938 |
| 2,114,104 | Driscoll et al. | Apr. 12, 1938 |
| 2,381,454 | Huth | Aug. 7, 1945 |
| 2,584,771 | Wilkinson | Feb. 5, 1952 |
| 2,589,583 | Thompson | Mar. 18, 1952 |
| 2,742,160 | Fogwell | Apr. 17, 1956 |
| 2,792,123 | Donato | May 14, 1957 |